United States Patent [19]

Burlew et al.

[11] 4,134,672

[45] Jan. 16, 1979

[54] COPIER FINISHER FOR AN ELECTROGRAPHIC REPRODUCING DEVICE

[75] Inventors: Leroy E. Burlew, Clyde; Michael G. Reid; William E. Hunt, both of Rochester, all of N.Y.

[73] Assignee: Eastman Kodak Company, Rochester, N.Y.

[21] Appl. No.: 781,395

[22] Filed: Mar. 25, 1977

Related U.S. Application Data

[63] Continuation-in-part of Ser. No. 671,753, Mar. 30, 1976, abandoned.

[51] Int. Cl.[2] .................... G03G 15/00; B65H 39/02; B65G 57/00

[52] U.S. Cl. .................... 355/14; 214/6 N; 270/58; 355/3 SH

[58] Field of Search .................... 355/3 R, 3 SH, 133, 355/14; 214/6 N; 270/52, 58

[56] References Cited

U.S. PATENT DOCUMENTS

| | | | |
|---|---|---|---|
| 3,630,607 | 12/1971 | Korn et al. | 270/52 X |
| 3,709,595 | 1/1973 | Turner et al. | 355/133 X |
| 3,815,990 | 6/1974 | Newcomb et al. | 355/3 SH X |
| 3,908,978 | 9/1975 | Stemmle | 270/58 |
| 3,946,879 | 3/1976 | Jensen | 270/58 X |
| 3,997,154 | 12/1976 | Mol | 270/58 X |

*Primary Examiner*—Fred L. Braun
*Attorney, Agent, or Firm*—William F. Noval

[57] ABSTRACT

Copy finisher for assembling uncollated or collated copies produced by an electrographic copies into booklets in an intermediate tray, for stapling the booklets, if desired, and for selectively stacking the booklets in an offset or straight manner in an output tray. If a malfunction, such as a paper jam, occurs in the copier, the finisher will assemble the copies in process in the finisher into a booklet and offset stack the booklet in the output tray. If the number of copies in a copy set produced by the copier exceeds the copy assembling limit of the intermediate tray, the finishing apparatus will assemble the copies of the set into subbooklets of copies equal to or less than the copy limit of the intermediate tray and stack all of the subbooklets of a copy set at the same location in the output tray.

10 Claims, 14 Drawing Figures

COPIER FINISHER FOR AN ELECTROGRAPHIC REPRODUCING DEVICE

BACKGROUND OF THE INVENTION

1. Field of the Invention

This invention relates to copy finishers for assembling copies into booklets, for stapling the booklets, if desired, and for stacking the booklets in a straight or offset manner in an output tray.

2. Description of the Prior Art

Copy processing devices, such as copy finishers, for processing copies made by reproduction apparatus are known in the art. Thus, U.S. Pat. No. 3,630,607 discloses a xerographic reproducing machine including document handling apparatus which recirculates a set of originals to an exposure platen of a xerographic copier, a copier for producing a series of copies corresponding to the set of originals and a copy finisher for assembling the copies into sets in an intermediate tray assembly, for offsetting alternate sets by means of a set separation assembly and for ejecting the sets into an output tray where they are stacked in staggered, i.e., offset, manner. U.S. Pat. Nos. 3,671,094; 3,682,328; 3,685,712; 3,690,537 and 3,709,595 disclose a xerographic processor including a recirculating document feeder, a xerographic copier and a copy finisher which functions either to assemble copies into booklets for stapling in an intermediate tray assembly before straight stacking the stapled booklets in an output tray or to offset stack copy sets in the output tray by causing individual copies to bypass the intermediate tray assembly and to be individually offset stacked in sets in the output tray by means of a paddle wheel assembly. U.S. Pat. Nos. 3,902,709 and 3,908,978 disclose binless sorters used with xerographic copiers which produce uncollated copies, the sorters having output trays which may be reciprocated in order to offset stack copy sets produced by the sorter. U.S. Pat. No. 3,946,879 discloses a device for stacking bundles of paper crosswise in an output hopper.

Although the various copy processing devices disclosed in the aforementioned patents may have been appropriate for their intended uses, certain deficiencies thereof may be noted. Where copies are assembled in an intermediate tray before offset stacking, such as is disclosed in U.S. Pat. No. 3,630,607, no provision is made for situations where the number of copies to be offset stacked in the output tray is greater than the copy assembling limit of the intermediate tray. Such assembling capacity thus limits the usefulness of such copy finisher when it would be desirable to offset stack larger sets of copies. In addition, if a malfunction, such as a paper jam, should occur in the copier in conjunction with which the copy finisher is operating, it would be desirable to be able to identify the copy set in progress in the finisher output tray since such set may be either incomplete or include mangled sheets. None of the aforementioned patents disclose such capability.

SUMMARY OF THE INVENTION

In general, according to an aspect of the present invention, a copy finisher is provided for assembling into booklets in an intermediate station, copies constituting a set produced by a copier, for offset stacking the booklets at an output station and, if the number of copies in a copy set produced by the copier exceeds the copy assembling limit of the intermediate station, for assembling the copies of the set into subbooklets of copies equal to or less than the copy limit of the intermediate station and for stacking all of the subbooklets of a copy set at the same location at the output station. According to another aspect of the invention, if a malfunction, such as a paper jam, occurs in the copier to shut it down, the copy finisher will assemble the copies in process in the finisher into a booklet and offset stack the booklet at the output station.

BRIEF DESCRIPTION OF THE DRAWINGS

In the detailed description of the preferred embodiment of the invention presented below, reference is made to the accompanying drawings, in which.

DETAILED DESCRIPTION OF A PREFERRED EMBODIMENT

In order to assist in an understanding of the present invention, the operation of a feeder, an electrographic copier and copy finisher in which the invention may be used will be briefly described. It is to be understood, however, that the present invention could be used with equal facility and advantage in other copy finishers or copy processing devices and, therefore, that the following description of apparatus related to but not forming part of the invention is provided for illustrative purposes only.

Figure 1:
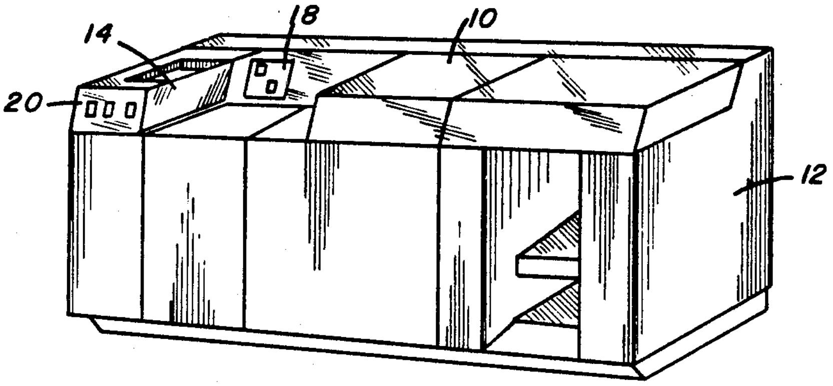
FIG. 1 is a perspective view of a recirculating feeder, electrographic copier and copy finisher.

Referring now to FIG. 1, there is shown electrographic copier 10, finisher 12 and recirculating document feeder 14 mounted over the document platen of copier 10. A first control panel 18 including control switches and displays is located on copier 10 for providing control of the operation of copier 10 and a second control panel 20 including control switches and displays is provided on feeder 14 for control of the operation of feeder 14 and finisher 12.

Figure 2:
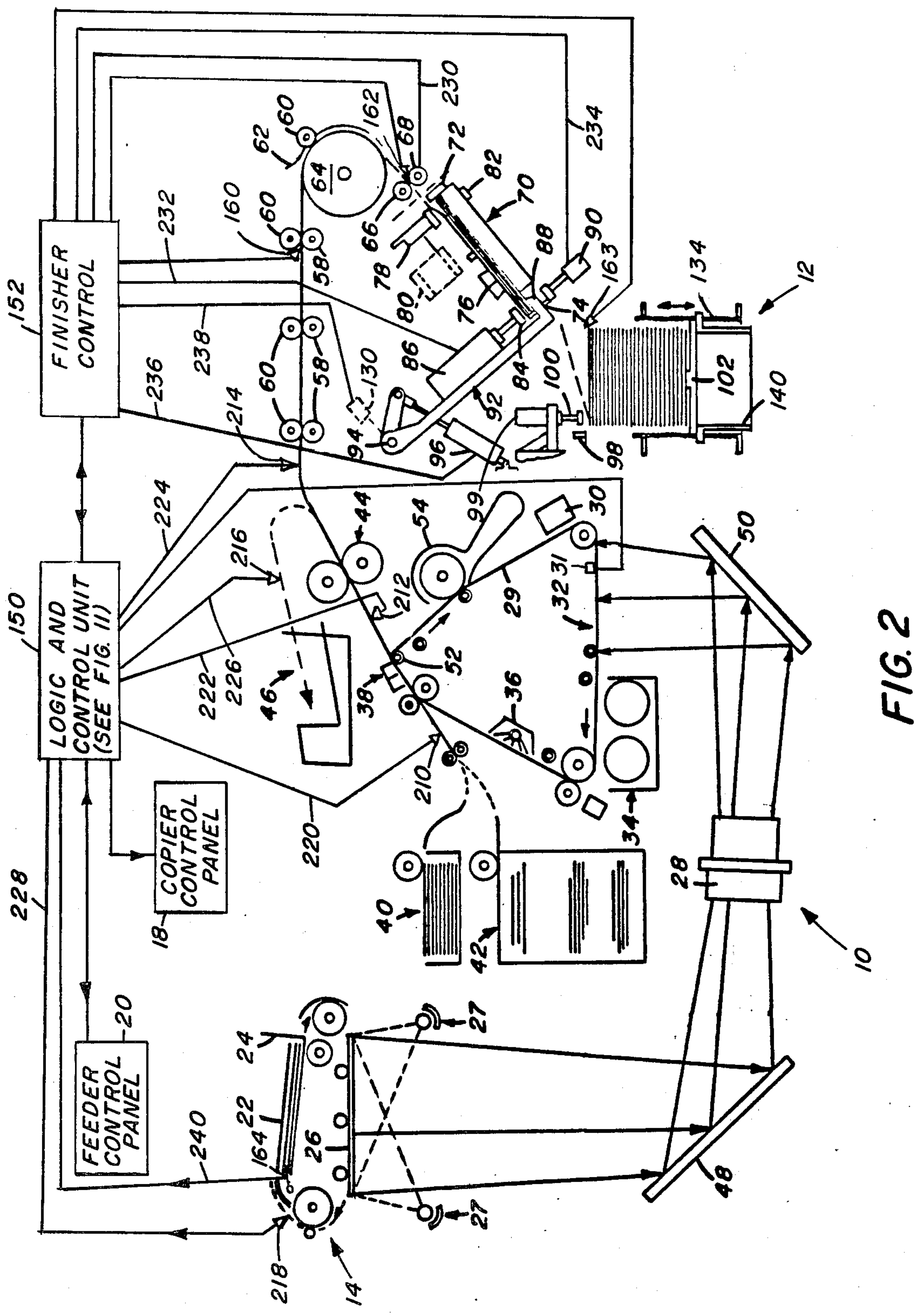
FIG. 2 is a diagrammatic view of the feeder, copier and finisher of FIG. 1.

Referring now to FIG. 2, there is schematically illustrated copier 10, finisher 12 and recirculating document feeder 14. The function of feeder 14 is to present a stack of originals one at a time to the exposure platen of copier 10 and to return the originals to the top of the stack. The feeder may be operated in either a collate or non-collate mode. In either mode a stack of originals 22 are placed into receiving tray 24 with the originals face up. Originals are serially interchanged on the exposure platen 26 of copier 10 in reverse sequential order so that the copy output of copier 10 to finisher 12 is also in reverse sequential order (e.g. pages 5, 4, 3, 2, 1; 5, 4, 3, 2, 1; etc.).

In the non-collate mode, the copies per original entered into control panel 18 of apparatus 10 are made and the original is returned to the top of the stack of originals after the requested exposures per original is completed. In the collate mode, one copy per original for each original in the stack is made in reverse sequential order and each original is returned to the top of the stack after one exposure. The stack of originals is recirculated to the exposure platen until the number of sets requested are made.

Electrographic copier 10 may be any suitable copier well known to those skilled in the art. An illustrative copier is shown and described in commonly-assigned U.S. Pat. No. 3,876,106, issued Apr. 8, 1975. As shown in FIG. 2, copier 10 includes exposure platen 26, flash lamps 27, lens 28, photoconductive web 29 (which is relatively transparent and which is moved continuously in a clockwise direction as shown in FIG. 2), charging station 30, exposure station 32; magnetic brush development station 34, post development erase station 36, transfer station 38, copy sheet supplies 40 and 42, fusing station 44 and output tray 46.

In operation, an original 22 positioned on platen 26 is illuminated by radiation from flash lamps 27. Such radiation is reflected from original 22 and projected by lens 28 and mirrors 48 and 50 onto photoconductive web 29 to form an electrostatic latent image thereon corresponding to the information contained on original 22. At development station 34, the moving electrostatic image is contacted by toner particles which adhere by electrostatic attraction to the charged portions of the electrostatic image to develop and render it visible.

At post development erase station 36, a lamp illuminates the photoconductive layer of web 29 to facilitate subsequent toner image transfer and to reduce photoconductor fatigue.

Transfer station 38 causes toner particles to be transferred in an imagewise configuration to a receiving surface of a copy sheet of paper which is transported in synchronism with the developed image from a selected one of supplies 40 and 42. When the copy sheet reaches the position on web 29 just above roller 52, web 29 bends sharply around the roller and the copy sheet continues in an essentially straight-line path to separate from web 29 and move to fusing station 44 where the toner image is heated and fused to the copy sheet to provide a substantially permanent copy. The copy sheet is then either transported into output tray 46 or to finisher 12.

Cleaning station 54 is provided so that residual toner may be removed from the photoconductive layer of web 29 prior to charging at charging station 30.

General Description of Finisher 12

Finisher 12 is capable of functioning in several modes of operation. If feeder 14 and apparatus 10 are programmed to produce a non-collated set of copies the copies are assembled into booklets in an intermediate station or tray in finisher 12 and may be stacked in either a straight or offset manner in the finisher output station tote tray. If feeder 4 and apparatus 10 are programmed to produce a collated set of copies corresponding to a set of original documents, the copies are assembled into a set in the intermediate station in finisher 12, stapled together with one or two staples, if desired, and stacked in either a straight or offset manner in the finisher output tote tray.

Finisher 12 may be a separate unit from copier 10 and in such case is mounted on caster wheels (not shown) which are adjustable to bring copier 10 and finisher 12 into orthogonal relationship so that the exit path of copier 10 is in alignment with the input path of finisher 12.

Copies emerging from copier 10 are transported along an upper path by three sets of drive rollers 58 and idler rollers 60, the speeds of the roller pairs 58, 60 being graduated to accelerate the copies to a faster and faster velocity. At the extreme right end of the upper path the copies are deflected around a corner by guide 62, and turnaround rollers 64, until the copy arrives at the nip of rollers 66, 68.

Since it will be desirable to provide as much time as possible for the stapling and/or stacking operations that follow, a momentary interruption to the flow of copies is provided by applying a brake (not shown) to rollers 66, 68 so that the first two copies of a set are assembled at the nip.

The stapling and stacking operations of the preceding set are timed to be completed soon after the second copy arrives at rollers 66, 68 and subsequently, the brake on drive rollers 66, 68 is released and both copies are propelled into intermediate copy assembling station, including tray 70.

Copy assembling tray 70 is inclined to the horizontal so that delivered copies tend to lie flat on top of each other assisting in reducing the natural curl of the copies created by the fusing operation in copier 10. As copies are transported into tray 70 by rollers 66, 68, they pass over eccentric jogger 72 which is continuously rotated by a pulley and a belt (not shown). As the copies settle into tray 70, they are repeatedly struck against the trailing edge by eccentric jogger 72 and are urged against gate 74. In addition, the copies are urged against a side guide (not shown) by a second similar eccentric side jogger 76. All copies are urged thereby towards the front lower corner of tray 70.

Mounted above hopper 70, is a stapler 78 and wire spool 80. The stapler is actuated by a pressure bar 79 (FIG. 7) which is translated in response to timed commands to depress the ram of stapler 78, forcing a piece of wire from spool 80 to be cut to proper length, preformed, and driven through the booklet. At the completion of the drive stroke, clincher assembly 82, is actuated to bend the protruding ends of the wire staple flat against the back side of the booklet.

At the completion of the stapling operation, a movable jaw 84, actuated by pneumatic cylinder 86 is caused to grip the booklet (whether stapled or not) in cooperation with fixed jaw 88. When the booklet is gripped, gate 74 is lowered by means of a pneumatic cylinder 90 out of the path of the booklet.

Swinging arm 92, which mounts jaws 84, 88 and cylinder 86, is caused to rotate about pivot shaft 94 by means of a pneumatic cylinder 96 and to draw the booklet out of the hopper 70. Gate 74 is then returned to its sheet blocking position after the booklet has cleared gate 74.

Swinging arm 92 transports the booklet in a curved path to an output station 97 where the combined action of stripping fingers 98, release of jaw 84 and the tamping of tamper 100 actuated by pneumatic cylinder 99 cause the booklet to be stacked on top of tote tray 102.

As a booklet is being stripped into tray 102, gate 74 closes for acceptance of the first two sheets of the next booklet that were delayed at the nip of rollers 66, 68. Once a booklet has been stripped from gripper jaws 84, 88 the direction of transport arm 92 is reversed and arm 92 returns to the hopper.

Figure 8:
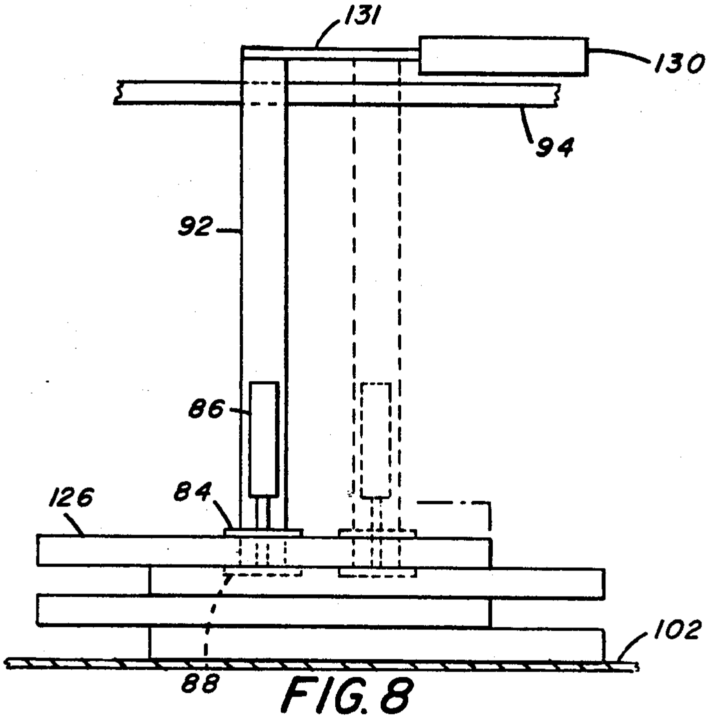
FIG. 8 is a diagrammatic elevational view showing the offset stacking assembly of the finisher of FIGS. 1 and 2.
Figure 9:
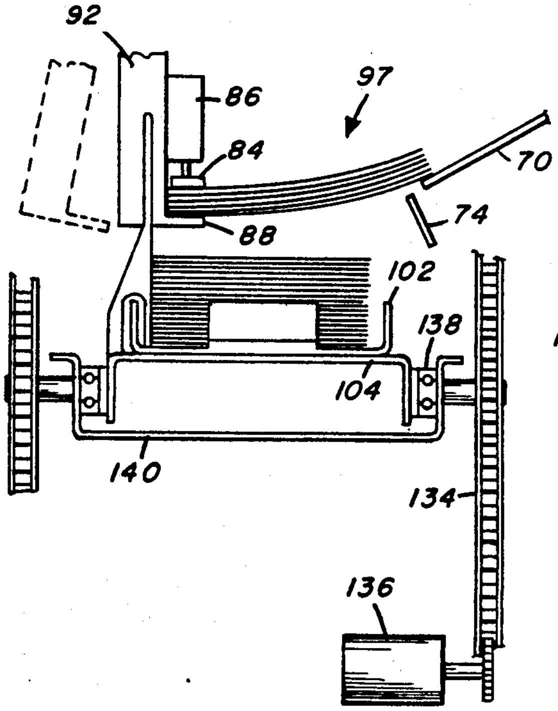
FIG. 9 and 10 are front and side diagrammatic elevational views, respectively, showing the transport arm and output tote tray assemblies of the finisher of FIGS. 1 and 2.
Figure 10:
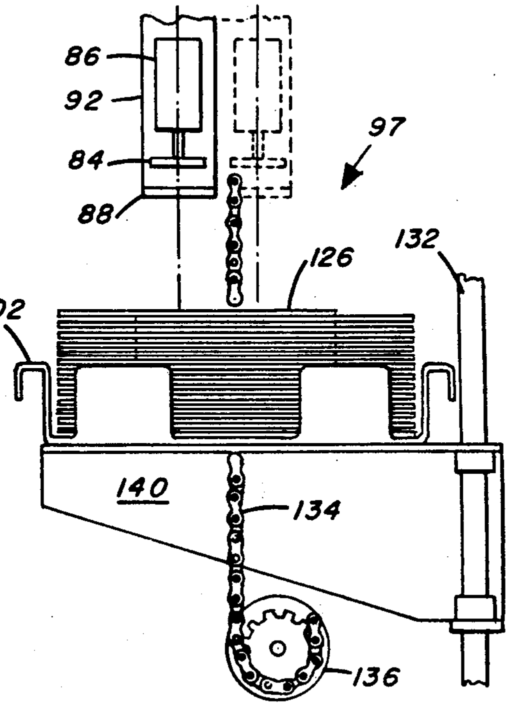

Referring to FIGS. 8–10, there is shown in greater detail output station 97 and the offset stacking assembly of finisher 12. As shown, in the offset stacking mode, booklets 126 are stacked on tray 102 positioned at output station 97 in first and second locations offset with respect to each other. Offset stacking is effected by moving transport arm 92 forwardly a predetermined distance on shaft 94 (FIG. 8) for every other booklet transported from tray 70 to tray 102 by actuation of pneumatic cylinder 130 linked to arm 22 by linkage 131. As arm 92 is returned to collection tray 70, cylinder 130 will more arm 92 back to its rearward position so that the next booklet will be stacked rearwardly of the previous booklet. This provides offset stacking of alternate booklets.

Tote tray 102 accepts the booklet as it is stripped from the gripper jaws 84, 88 on the transport arm 92. The booklets are stacked on top of each other in a vertical fashion. Tote tray 102 has upstanding end and side walls and is removable from finisher 12. Trays 102 are of one piece molded construction and are stackable. Tray 102 is dimensioned to accommodate the longest copy sheet which has been stacked in offset manner.

Th platform 104 (FIG. 9) which tray 102 rests on is mounted on slides 138 perpendicular to the front opening of finisher 12 such that at the completion of a job, the operator slides tray 102 with stacked booklets out of finisher 12, lifts tray 102 from platform 104 and carries it away. Slides 138 are mounted on elevator 140 which is cantilevered out from two guide rods 132 and connected to chains 134 driven by reversible motor 136 which drives elevator 140 and tote tray 102 up and down. The height of the stack of booklets is controlled by a photooptic system (not shown) which constantly monitors the height of the stack to lower the platform 104 to maintain the top of the stack of copies at a desired level which is just below the path of the swinging arm 92.

Figure 3:
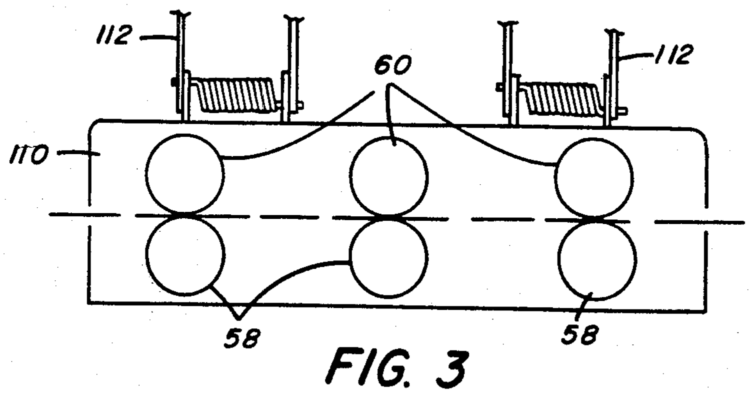
FIG. 3 is a diagrammatic elevational view showing the assembly for movably mounting the upper rollers of the upper paper path in the finisher of FIGS. 1 and 2.

In order to provide access to the upper paper transport path and to the stapler, idler rollers 60 are mounted on a cover frame 110 which swings up and which is counterbalanced by constant force springs 112 (FIG. 3).

Figure 4:
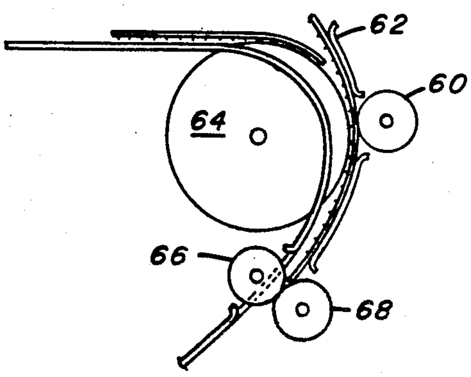
FIG. 4 is a diagrammatic elevational view showing the paper turnaround assembly of the finisher of FIGS. 1 and 2.

Interruption of the first two copies of a set by rollers 66, 68 is shown more clearly in FIG. 4 which shows the first two copies of a five page set. The first copy to be delivered by elecrtographic copier 10 is the last page of the set (page 5 in this example). It is stopped by the nip of rollers 66, 68 by applying a brake (not shown) to rollers 66, 68. As page 5 arrives at the nip, its trailing edge is propelled, urged by sponge like turn around roller 64 so as to hug the curvature of guide 62. Page 5, thereby, acts as a guide for the next copy, page 4, which is also urged into the nip of rollers 66, 68 by roller 64. After page 4 has arrived at the nip of rollers 66, 68 the previous stapling and/or booklet transport operations will have been substantially completed and rollers 66, 68 are driven to feed sheets 4 and 5 into hopper 70.

Figure 5A:
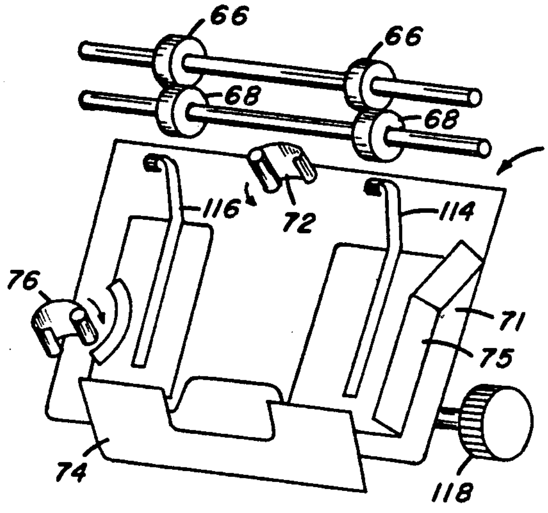
FIG. 5a and 5b are diagrammatic perspective and elevational views, respectively, showing the collection hopper and jogging assemblies of the finisher of FIGS. 1 and 2.
Figure 5B:
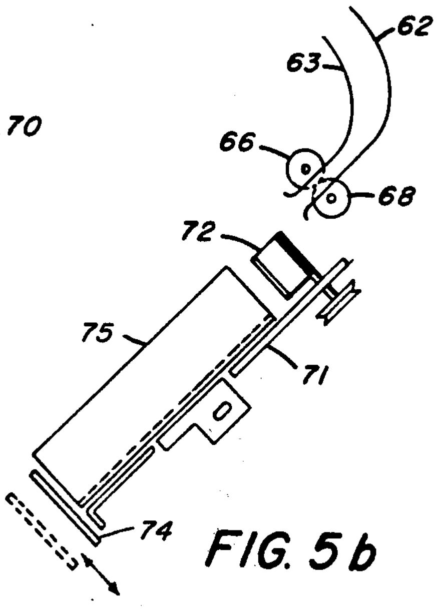

FIGS. 5A and 5B show in greater detail the structure of tray 70. As shown, tray 70 includes an inclined bottom wall 71 and adjustable side guide 75. A pair of flexible strips 114 and 116 are suspended above bottom wall 71 and assist in holding copies flat. Rear jogger 72 and side jogger 76 are shown as curved spring elements which are rotatably mounted so that an eccentric motion is effected thereby to urge copies into registration in the corner formed by side guide 75 and gate 74.

To accommodate different paper sizes, side guide 75, and side jogger 76 are mounted on sliding guides (not shown) and are driven in coordination by a left/right lead screw attached to knob 118. Adjustment is possible over the entire range of paper sizes which may be used in copier 10 and finisher 12. Detents are provided at six paper size positions of 8.27 × 11.7, 8½ × 14, 8½ × 13, 8½ × 11, 8 × 10 and 8 × 10. Gate 74 is also movable (FIG. 5B) and is translated in coordination with the side guide 75, so that for paper sizes of 8 × 10 and 8 × 10, the trailing edge of the copies will always bear a fixed relationship to side jogger 76, and the position of stapler 78. Under the lead screw shaft are sets of switches which inform the logic and control unit 150 of apparatus 10 in which position the hopper guides are. A warning display will appear on feed control panel 20 if there is a mismatch between the finisher hopper guides and the copier paper supply guides.

After stapler 78 has driven a staple through a copy booklet, clinchers 120 and 122 (FIG. 6) of clincher assembly 82 are actuated to clench staple 124 to booklet 126. In addition, clinchers 120, 122 are electrically isolated from the machine frame so that a sensing signal may be applied to clinchers 120, 122 to detect whether the electrically conductive wire staple did in fact penetrate the booklet. In case of loss of wire feed, improper wire cut length, or deformation of the wire during the driving stroke, a failure of continuity in either test circuit will cause a display to be actuated on panel 20 through finisher control 152 and copier logic and control unit 150.

Control of Finisher, Copier and Feeder

The operation of finisher 12 is synchronized with the operation of copier 10 and feeder 14 by means of a logic and control unit (LCU) 150 located in copier 10 and finisher control 152 located in finisher 12. To coordinate operation of the various work stations 30, 32, 34, 36, 38 and 54 of copier 10 with movement of the image areas on the web 29 past these stations, the web has a plurality of perforations (not shown) along one of its edges. At a fixed location along the path of web movement, there is provided suitable means 31 for sensing web perforations. This sensing generates input signals into a LCU 150 having a digital computer. The digital computer has a stored program responsive to the input signals for sequentially actuating then de-actuating the work stations as well as for controlling the operation of many other machine functions as disclosed in U.S. Pat. No. 3,914,047. As will be described in greater detail later, feeder 14 and finisher 12 are also controlled by LCU 150.

Logic and Control Unit 150

Programming of a number of commercially available minicomputers or microprocessors, such as an INTEL model 8008 or model 8080 microprocessor (which along with others can be used in accordance with the invention), is a conventional skill well understood in the art. The following disclosure is written to enable a programmer having ordinary skill in the art to produce an appropriate program for the computer. The particular details of any such program would, of course, depend upon the architecture of the selected computer.

Figure 11:
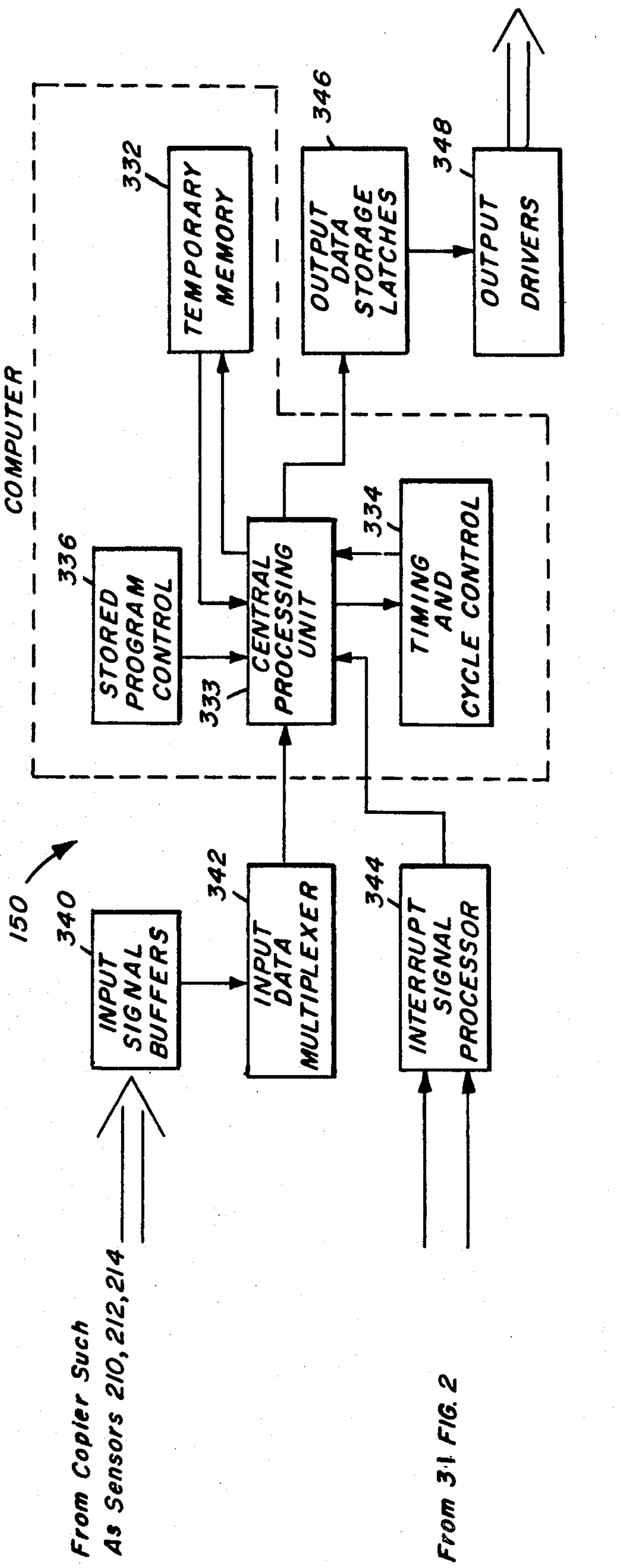
FIG. 11 is a block diagram of the logic and control unit shown in FIG. 2.

Turning now to FIG. 11, a block diagram of a typical logic and control unit (LCU) 150 is shown which interfaces with the copier 10 feeder 14 and control 152 of finisher 12. The LCU 150 consists of temporary data storage memory 332, central processing unit 333, timing and cycle control unit 334, and stored program control 336. Data input and output is performed sequentially under program control. Input data is applied either through input signal buffer 340 to a multiplexer 342 or to signal processor 344 from perforations detected on the web 29. The input signals are derived from various switches, sensors, and analog-to-digital converters in copier 10, feeder 14 and finisher 12, from control panels 18 and 20 and from finisher control 152. The output data and control signals suitable applied to storage latches 346 which provide inputs to suiable output drivers 348 which are directly coupled to leads which, in turn, are connected to the work stations and to finisher control 152. More specifically, the output signals from the LCU 150 are logic level digital signals which are buffered and amplified to provide drive signals to various clutches, brakes, solenoids, power switches, in the various work stations of copier 10, feeder 14 and finisher 12 through control 152, and to displays in control panels 20 and 18.

The LCU 150 processing functions can be programmed by changing the instructions stored in the computer memory.

The time sequence of machine control signals (often referred to in the art as events) is critical to the copy cycle because the copier, feeder and finisher stations and associated mechanisms must be powered ON and OFF in the correct sequence to assure high quanity copying and to prevent paper misfeeds, misregistration, and erratic operation. One way of controlling the time sequence of events and their relationship to each other is, as noted above, to sense perforations which correspond to the location of the image elements on the web 29 as these elemets continue through the cycle of the copier's endless path. Thus, the detection of perforations by a sensor 31 is applied to the LCU 150 through the interrupt signal processor 344 (see FIG. 11) and is used to synchronize the various control mechanisms with the location of the image elements. These perforations generally are spaced equidistant along the edge of the web member 29. For example, the web member 29 may be divided into six image areas by F perforations; and each image area may be subdivided into 51 sections by C perforations. These F and C perforations (not shown) are described in U.S. Pat. No. 3,914,047.

Returning now to the computer, the program is located in stored program control 336 which may be provided by a conventional Read Only Memory (ROM). The ROM contains the operational program in the form of instructions and fixed binary numbers corresponding to numeric constants. These programs are permanently stored in the ROM(s) and cannot be altered by the computer operation.

Typically, the ROM is programmed at the manufacturer's facility, and the instructions programmed provide the required control functions such as: sequential control, jam recovery, operator observable logic, machine timing, booklet offsetting and subbookletting. For a specific example, the total ROM capacity may be approximately 2,000 bytes with each byte being 8 bits in length. The program may require more than one ROM.

The temporary storage memory 332 may be conveniently provided by a conventional Read/Write Memory. Read/Write Memory or Random Access Memory (RAM) differs from ROM in two distinct characteristics:

1. Stored data is destroyed by removal of power; and
2. The stored data is easily altered by writing new data into memory.

For specific example, the RAM capacity may be 256 bytes; each byte eight bits in length. Data, such as: copy requested count, copies processed count, and copies delivered count at the exit as indicated by the switch 214, are stored in the RAM until successful completion of a copy cycle. The RAM is also used to store data being operated on by the computer and to store the results of computer calculations.

Sensors 210, 212, 214 and 216 spaced along the copy path of copier 10 and sensor 218 along the document path of feeder 14 provide inputs along leads 220, 222, 224, 226 and 228 respectively to LCU 150 to indicate copy sheet jam conditions which may necessitate shutdown of copier 10 and feeder 14 in order to prevent damage to the various components thereof.

Control of Finisher

The operation cycle of copier 10 is selected and initiated by actuation of switches on electrographic apparatus control panel 18. The operator selects the desired mode of operation such as one sided of two sided copying side or top exit of copies from copier 10 and enters the number of copies of each original or number of sets to be made. This information is then stored in the temporary storage memory of LCU 150. The finisher modes of operation are selected by actuation of switches on feeder control panel 20. These modes are collate or non-collate copies, stapled or not stapled booklets, and straight or offset stack of booklets in the output tray.

As will be explained in detail later, when finisher 12 is operating in the offset stacking mode, if the number of copies produced by copier 10 exceeds the limit of copies which can be handled in the collection tray 70 of finisher 12, according to the present invention, the finisher will operate in the subbooklet mode and subbooklets of copies equal or less than the copy limit will be assembled in the collection tray 70 of the finisher 12 and the subbooklets will be transported to the same location in the outut tote tray 102 so that all the copies of a booklet will be offset to the same location to form a single identifiable booklet.

As will also be explained in detail later, according to another aspect of the invention, if a paper jam should occur in copier 10 or feeder 14 so that an improperly formed booklet (such as with insufficient pages) is produced, copier 10 and feeder 14 will be shut down by LCU 150 until the jam is cleared and the copies in process in finisher 12 will be offset stacked in output tote tray 102 in order to indicate to the operator the improperly formed booklet to be removed from the stack.

The operator is required to position each selected stapler 78 to the desired detent position. An operator selector switch (not shown) is provided to allow the operator to select the front, back or both staplers 78. The selected stapler 78 must be adjusted to a detent position compatible for the paper being used in the selected copier paper supply 40, 42. The operator is also required to position the jogger guides (not shown) supporting guide 74 and jogger 76 to the corresponding detent position selected on the selected copier paper supply. Paper length compatibility monitoring and display will be discussed later.

The operator selectable control modes are not monitored by LCU 150 during a copy run and can be changed by stopping the copy run by depressing STOP switch (not shown) on the copier control panel 18.

If a finisher job is completed and a non-finisher job is to be run on copier 10; the last selected finisher/feeder modes are stored in the LCU 150 and re-selected when finisher operation is requested.

After the feeder and finisher modes are selected and desired sets or copies are entered on the copier control panel 18, the finisher tote tray 102 will rise to interrupt the tote up sensor 163 and lower a predetermined amount under control of LCU 150 and finisher control 152 when the start button on panel 18 is depressed.

The finisher transport motor and compressor turn on a short delay after copier 10 start-up to prevent finisher 12 AC loads from being applied during copier start-up.

The copiers that exit from copier 10 into the finisher transport assembly pass the Delivered to Nip Sensor 160, rollers 66, 68 and the Delivered to Gate Sensor 162 as they enter into tray 70 where they are jogged on the side and top to square the copy set. The first two sheets of each set are stopped at the nip rollers 66, 68 to allow time for stapling and transport of the preceding set from tray 70. The first two sheets of each set are driven into tray 70 together and the rest of the set is delivered to tray 70 without being stopped.

Figure 7:
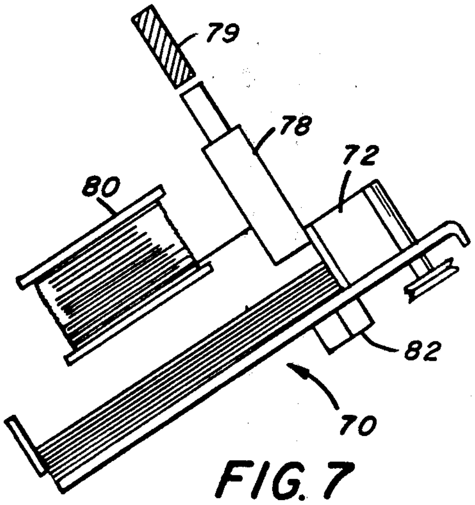
FIG. 7 is a diagrammatic elevational view showing the stapler of the finisher of FIGS. 1 and 2.

After the last sheet of the set has been delivered to tray 70, as determined in the collate mode by LCU 150 using the Feeder Set Count Signal from sensor 164 in feeder 14 or in the non-collate mode, by the copies requested on the copier control panel 18, the staple command is given (if selected) and the staplers 78 are driven down by a cross bar 79 (FIG. 7). Wire is indexed, before stapling, into the selected stapler 78 by the wire feed cylinders (not shown). The operator selector switch determines which stapler/staplers are fed wire by LCU 150 command.

After the staple/staples have been driven into the copy set and clinched, the gate 74 is opened and the gripped set is transported to the tote tray 102 and stacked. While the transport arm 92 is traveling away from gate 74, if offset mode is selected on feeder control panel 20, LCU 150 gives an enable command to finisher control 152 to cause transport arm 92 to be driven toward the front of the finisher 12 to provide offset stacking. As arm 92 continues to move away from gate 74, a series of switches (not shown) are actuated to initiate closing of gate 74 to allow collection of a subsequent set of copies into a booklet in tray 70, opening of jaw 84 to allow the gripped booklet to be stacked on tray 102, tamping of the booklet by tamper 100 and return of arm 92 to the gate area for start of another transport cycle.

The LCU 150 monitors the tote up sensor 163 and will command the tote tray elevator 140 down a predetermined amount each time tote up sensor 163 is blocked.

The tote tray elevator 140 is commanded down to a level for optimum accessibility at the completion of each job or when a finisher jam occurs as determined by monitoring of sensors 160 and 162 by finisher control 152.

LCU 150 and finisher control 152 will override the staple mode when the set size in tray 70 exceeds the stapling capability of finisher 12 and cause these sets to be stacked unstapled in tray 102. In such case an assistance code will be displayed on copier control panel 18 to inform the operator and the copier/feeder/finisher system will shut down at the completion of the unstapled set.

The number of stapled sets stacked on the tote tray 102 is monitored by LCU 150 and when the number of stapled sets exceeds a programmable limit, based on optimum stacking of stapled sets on the tote tray 102, the copier/feeder/finisher system will complete the set in process and shut down. A "Finisher Full" display will be displayed on feeder control panel 20 to notify the operator that the tote tray 102 should be emptied. "Finisher Full" will also be displayed when tray 102 reaches a tote down limit switch (not shown).

Figure 6:
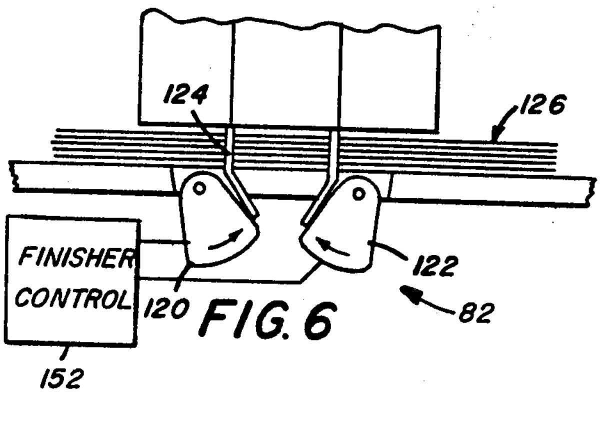
FIG. 6 is a diagrammatic elevational view showing the staple sensing assembly of the finisher of FIGS. 1 and 2.

Sets are monitored by LCU 150 and control 152 for proper staples by monitoring for a ground signal from each staple leg as the staple is clinched (FIG. 6). If a ground signal is received from one staple leg 124 and a ground signal is received from the other staple leg 124 at the same time a signal will be generated by finisher control 152 and sent to LCU 150 to signal that the staple had properly driven through the set and clinched. The clincher fingers 120, 122 for each detent location for both staplers 78 are monitored to determine if proper stapling had taken place for the selected stapler/staplers. A "Staple Missing" display will be displayed on copier control panel 18 if improper stapling occurs. If improper stapling occurs twice in succession the copier/feeder/finisher system will complete the set in process, shut down, and actuate the "Staples Missing" display.

Jam Condition in Copier on Feeder

As discussed earlier, LCU 150 monitors the flow of copies in copier 10 by means of sensors 210, 212, 214 and 216, and the flow of documents in feeder 14 by means of sensor 218 to determine if a jam has occured in feeder 14 or copier 10. Sensors 210–218 may be of any well known kind capable of sensing the presence of a sheet of material, and may, for example, be electromechanical, such as microswitches, photooptic, such as LED/phototransistor combinations, pneumatic or magnetic. A paper jam will cause immediate shutdown of copier 10 and feeder 14.

In the copying mode of copier 10, the flow of paper under nominal conditions from the supply bins 40 or 42 to the exits is predictable. The time between initiation of paper feed and arrival of paper at any of the paper sensors 210, 212, 214/216, can be expressed in terms of film perforation signals. The film perforation signal count is stored in the computer in the LCU 150 (FIG. 11); at designated perforation count intervals, the paper sensors are interrogated. If paper has not arrived at the sensor within the expected perforation count interval, a malfunction is indicated. Likewise, if paper has not cleared a sensor within the expected perforation count interval, a malfunction is indicated. It is important to note that the paper jam detection system is not based on time measurement, but on perforations counted by the computer. The LCU 150 knows the positions of the copy sheets traveling through the machine in terms of perforation counts. This concept is more fully described in U.S. Pat. No. 3,914,047.

Attention is now directed specifically to the sensor 214 or 216 located at the exit of the copier. At predetermined perforation counts, the computer samples the state of the selected sensor to verify that the copy paper has in fact cleared the exit. This verification will be accomplished as follows: at the appropriate time, the computer will check to see if there is a copy sheet at the sensor (logic "1"). Prior to this time, the next sheet should have arrived. After the copy sheet has exited, the sensor should be open (logic "0"). Logic "0" refers to trailing edge detection. If a trailing edge is not detected prior to recept of a subsequent leading edge, a paper jam is indicated and the LCU 150 will shut down operation of copier 10 and feeder 14. The computer also counts the number of sheets that have properly exited the copier and stores the cumulative total number which is used in the subbookletting mode (to be described later).

Copier jam recovery is accomplished by opening machine access covers, alleviating the problem (i.e. removing the jammed sheets), and closing the covers.

In like manner, LCU 150 interrogates sensor 218 to determine whether an original document has been fed past it after an exposure cycle has been completed. If a jam is detected in the feeder, LCU 150 will shut down copier 10 and feeder 14.

In case of shutdown of copier 10 and feeder 14 due to a malfunction, finisher 12 will continue to operate for a short time to clear copies in process in finisher 12 and to offset stack the copies in output tray 102 to give an indication to the operator of the malformed booklet.

Figure 12:
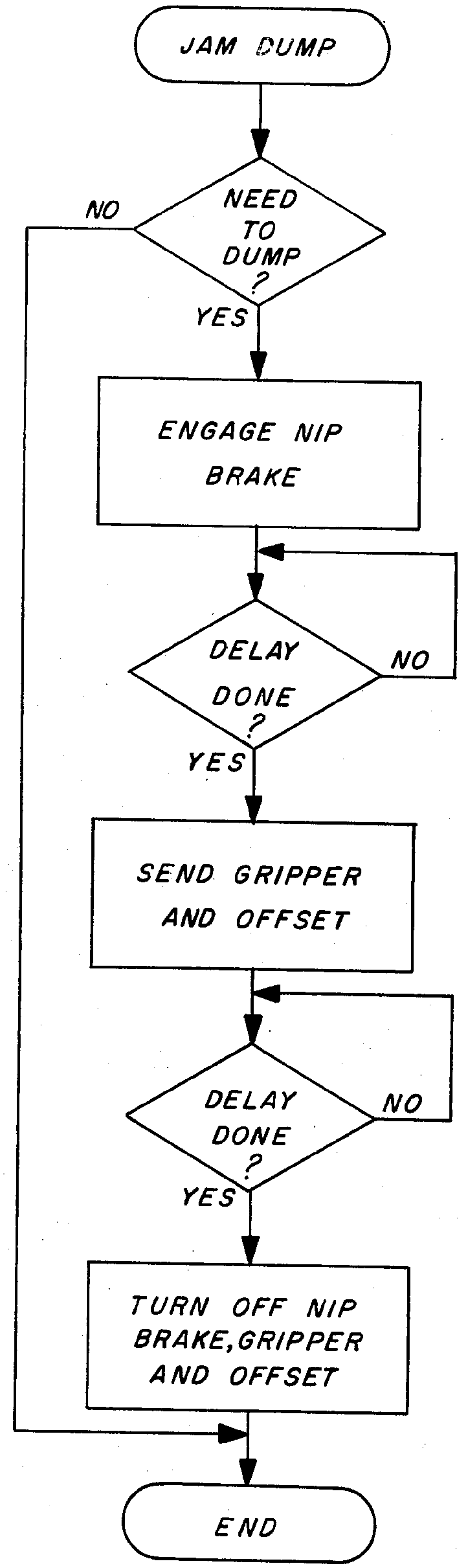
FIG. 12 is a flow chart of the sequence of operation of the finisher of FIG. 2 when a malfunction occurs in the feeder or copier.

FIG. 12 is a flow chart of the operation of finisher 12 according to an aspect of the present invention when such a copier malfunction occurs. As shown, when a jam occurs to shut down copier 10 and feeder 14 a "jam dump" condition is created. The first decision to be made is whether there is a need to dump. If there are not copies in process in finisher 12 then the answer is no and the finisher can be turned off. If there are copies in process in finisher 12, LCU 150 sends a signal to finisher control 152 to send a signal over lead 230 to turn on the brake applied to roller nip 66, 68 to prevent any further copies from entering collection tray 70.

The next decision in FIG. 12 is whether the delay is done i.e. whether the nip roller brake has stopped rollers 66, 68. If the answer is no, the interrogation is made again. If the answer is yes, LCU 150 sends signals to control 152 to actuate gripper 84 and offset arm 92. Control 152 sequentially actuates gripper solenoid 86 over lead 232 to grip the booklet in tray 70, gate solenoid 90 over lead 234 to open gate 74, transport arm solenoid 96 over lead 236 to rotate arm 92 thereby stripping the booklet from tray 70 and offset solenoid 130 over lead 238 to offset stack the booklet in tray 102. If the finisher has been operating in the straight stack mode, the offset booklet in tray 102 will give a ready indication to the operator of the booklet in process when the copier jam occured. If the finisher is operating in the offset stack mode, the jam booklet will be offset and will be noticeable as an extra thickness when it is combined with another normally processed booklet which has been offset in tray 102.

The next decision made is whether the latter operations have been completed after a predetermined delay. If they have, then LCU 150 sends signals to control 152 to turn off the nip brake, release gripper 84 so that the jam booklet can be stacked in the tray and return the transport arm to its normal rearward position. Control 152 then causes gate 90 to close so that a new set of copies can be collected in tray 70 after the jam has been cleared from copier 10 or feeder 14 and normal copying operation has resumed.

Finisher control 152 monitors copies as they pass sensors 160 and 162 and if a jam should be indicated, finisher 12 will be shut down and further copies produced by copier 10 will be diverted into top hopper 46.

Subbookletting Mode

According to another aspect of the present invention, finisher 12 is capable of operating in either offset or straight stack mode even if the number of copies in a set exceeds the copy assembling limit of intermediate collection tray 70 of finisher 12. In such case, LCU 150 will cause finisher 12 to operate in the subbooklet mode so that subbooklets of a set will be collected in tray 70 and stacked in the same location on tray 102. Thus, if the finisher is operating in an offset mode, subbooklets of copies equal to or less than the copy limit of tray 70 will be stacked in the same location in tray 102 until the booklet is completely stacked. All the subbooklets of the next booklet will be then offset stacked with respect to the previous booklet in the same location.

In the context of this application a "subbooklet" constitutes an assembled number of copies equal to or less than the copy limit of collection tray 70 where the number of copies in a collated or noncollated set produced by copier 10 is greater than the copy limit of tray 70. Thus, if a copy set produced by copier 10 included 80 copies and the copy limit of tray 70 was 50 copies, finisher 12 would be operated in the subbooklet mode so that the first 50 copies would be collected in tray 70 and stacked in the selected manner in tray 102 and the next 30 copies would be collected in tray 70 and stacked in the same location in tray 102 as the previous 50 copies. In this manner, all 80 copies of the booklet would be stacked in the same location in tray 102 in the form of subbooklets of 50 and 30 copies.

Figure 13:
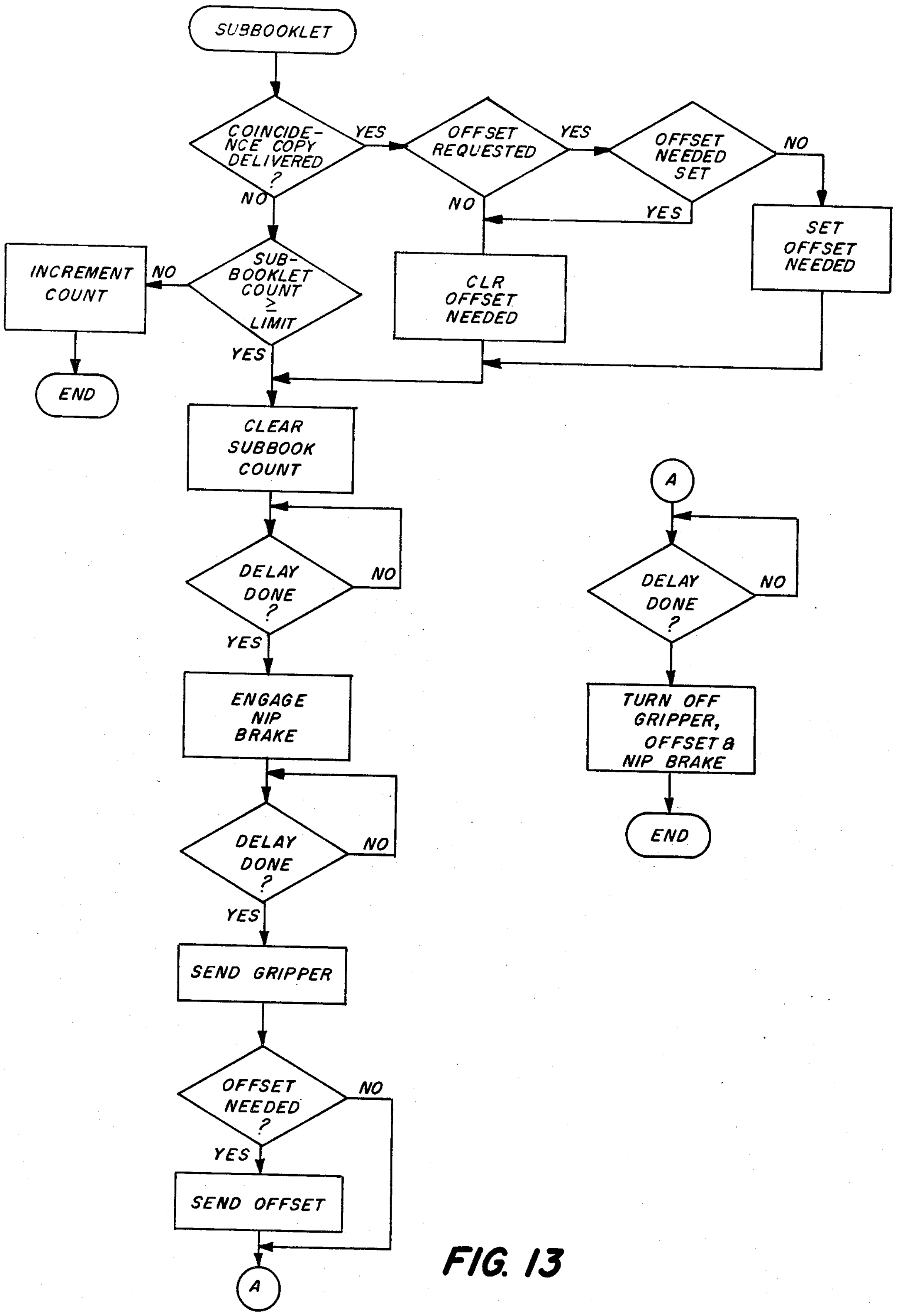
FIG. 13 is a flow chart of the sequence of operation of the finisher of FIG. 2 when it operates in the subbooklet mode.

Referring to FIG. 13, there is shown a flow diagram of the subbookletting mode of operation. The first decision which LCU 150 makes is whether a coincidence copy has been delivered to exit sensor 214 of copier 10. The coincidence signal is determined as follows: If the noncollate or manual mode has been selected, LCU 150 counts the number of copies which have exited from copier 10 as sensed by sensor 214 and compares this count with the copies requested count from copier control panel 18. If the two counts are equal, a coincidence copy is determined to have been delivered. If the collate mode has been selected on feeder control panel 20, a separator member 164 which has been engaged with the top of a set of originals placed in feeder 14 at the beginning of a copy run, falls through the bottom of the feeder tray when the last original in a set to be copied is fed from the stack and produces a set count signal which is fed to LCU 150 over lead 240. Receipt of this signal gives an indication of the completion of one set and identifies the coincidence copy as it exits from copier 10.

If the decision is made that a coincidence copy has not been delivered, the next step is to compare the subbooklet count with the copy limit count. If the subbooklet count is not equal to or greater than the copy limit then the subbooklet count is incremented and the subbooklet routine ended. If the subbooklet count is equal to or greater than the copy limit of tray 70 then the subbooklet count will be cleared and after delay is done, a nip brake engage signal will be sent from LCU 150 to finisher control 152. After the nip brake has been engaged, the gripper signal will be sent and the gripper caused to close on the subbooklet in tray 70. The decision is next made whether offset is needed, if it is, the offset signal will be sent and the transport arm will be offset. If the delay to permit offsetting has been completed, LCU 150 sends signals to finisher control 152 to turn off the gripper, offset and nip brake solenoids so that the subbooklet may be stacked in output tray 102, the transport arm returned to its normally rearward position, and subsequent copies collected in tray 70. The routine is then ended.

If the decision is made that coincidence copy has been delivered, then the offset switch is sampled. If offset has not been requested then offset needed is cleared. If offset has been requested then offset needed is sampled to determine if it has been set. If it has not been set, then the command is sent to set it, if it has been set, then the command is sent to clear offset needed. The routine is continued in the same manner as described above relating to the determination that the subbooklet count equals or exceeds the copy limit.

In such manner, if it is determined that the copies of a collated or uncollated set exceeds the assembling capacity of tray 70, then the finisher will assemble copies into subbooklets which will be stacked in the same location in output tray 102.

The invention has been described in detail with particular reference to the preferred embodiment thereof, but it will be understood that variations and modifications can be effected within the spirit and scope of the invention.

We claim:

1. Reproduction apparatus comprising:
- electrographic apparatus for producing a stream of copies forming a set of a preselected first number of copies;
- intermediate copy assembling means for receiving copies from said electrographic apparatus and for assembling said copies into a booklet equal to or less than a predetermined second number of copies;
- a copy output station having first and second stacking locations;
- transport means for transporting booklets along a path from said assembling means to said output station;
- said transport means being operable in a first mode when said preselected first number of copies in a copy set are equal to or less than the predetermined second number of copies in a booklet assembled in said assembling means to stack successive booklets alternately at said first and second locations of said copy output station; and in a
- second mode when said preselected first number of copies in a set is greater than the predetermined second number of copies in a booklet to stack successive booklets of copy sheets constituting a copy set at the same copy stacking location of said output station.

2. The reproduction apparatus of claim 1 wherein said transport means includes gripper means for gripping said booklet and means for moving said gripper means between said copy assembling means and said output station to move a booklet along said path.

3. The reproduction apparatus of claim 2 including additional means for moving said gripper means transverse to said path in order to effect stacking of said booklets at said first and second stacking locations of said output station.

4. The reproduction apparatus of claim 2 wherein said moving means includes an arm, wherein said gripper means is mounted on said arm and wherein said moving means further includes means for rotating said arm between said assembling means and said output station to transport a gripped booklet along said path between said assembling means and said output station.

5. The reproduction apparatus of claim 4 including means for moving said arm transverse to said path in order to effect stacking of said booklets at said first and second stacking locations of said output station.

6. Reproduction apparatus comprising,
- electrographic apparatus for producing a stream of copies;
- intermediate copy assembling means for receiving copies from said electrographic apparatus and for assembling said copies into a booklet;
- a copy output station having first and second booklet stacking locations;
- means for detecting a copy sheet jam in said electrographic apparatus;
- transport means for transporting copy booklets along a path from said intermediate assembling means to said output station and for stacking said booklets at said copy output station, said transport means being operable in a first mode to stack copy booklets at said first booklet stacking location of said output station when said electrographic apparatus is operating without a copy sheet jam and in a second mode to stack a copy booklet at said second booklet stacking location of said output station when said detecting means detects a copy sheet jam in said electrographic apparatus.

7. Reproduction apparatus comprising,
- electrographic apparatus for producing a stream of copies;
- intermediate copy assembling means for receiving copies from said electrographic apparatus and for assembling said copies into a booklet;
- a copy output station having first and second booklet stacking locations;
- means for detecting a copy sheet jam in said electrographic apparatus;
- transport means for transporting copy booklets along a path from said intermediate assembling means to said output station and for stacking said booklets at said copy output station, said transport means being operable in a first mode to stack copy booklets at said first booklet stacking location of said output station when said electrographic apparatus is operating without a copy sheet jam and in a second mode to stack a copy booklet at said second booklet stacking location of said output station when said detecting means detects a copy sheet jam in said electrographic apparatus;
- said transport means including gripper means for gripping said booklet and means for moving said gripper means between said copy assembling means and said output station to move a booklet along said path.

8. The reproduction apparatus of claim 7 including additional means for moving said gripper means transverse to said path in order to effect stacking of said booklets at said first and second stacking locations of said output station.

9. The reproduction apparatus of claim 7 wherein said moving means includes an arm, wherein said gripper means is mounted on said arm and wherein said moving means further include means for rotating said arm between said assembling means and said output station to transport a gripped booklet along said path between said assembling means and said output station.

10. The reproduction apparatus of claim 9 including additional means for moving said arm transverse to said path in order to effect stacking of said booklets at said first and second stacking locations of said output station.

* * * * *

UNITED STATES PATENT AND TRADEMARK OFFICE

CERTIFICATE OF CORRECTION

PATENT NO. : 4,134,672

DATED : January 16, 1979

INVENTOR(S) : L. E. Burlew, M. G. Reid and W. E. Hunt

It is certified that error appears in the above-identified patent and that said Letters Patent are hereby corrected as shown below:

Col. 4, line 9, delete "4" and insert --14--;

Col. 5, line 31, change "more" to --move--;

Col. 5, line 43, delete "Th" and insert --The--;

Col. 6, line 25, change "8 x 10" to --8 x 10½--;

Col. 6, line 27, change "8 x 10" to --8 x 10½--;

Col. 7, line 29, delete "suitable" and insert --are--;

Col. 7, line 30, change "suiable" to --suitable--;

Col. 8, line 40, delete "of" and insert --or--;

Col. 8, line 41, insert after "ing" insert --and--.

Signed and Sealed this

*Third* Day of *July 1979*

[SEAL]

*Attest:*

LUTRELLE F. PARKER

*Attesting Officer* *Acting Commissioner of Patents and Trademarks*